United States Patent Office.

IMPROVEMENT IN THE MANUFACTURE OF WHITE LEAD.

THOMAS M. FELL AND AMBROSE G. FELL, OF BROOKLYN, NEW YORK, ASSIGNORS TO THEMSELVES AND WM. BELL, OF NEW YORK CITY.

Letters Patent No. 59,901, dated November 20, 1866; antedated September 25, 1866.

SPECIFICATION.

TO ALL WHOM IT MAY CONCERN:

Be it known that we, THOMAS M. FELL and AMBROSE G. FELL, both of the city of Brooklyn, in the county of Kings, and State of New York, have invented certain new and useful Improvements in the Manufacture of White Lead, and do hereby declare that the following is a full and exact description thereof, to wit:

Our present invention consists, first, in the production of the sulphate of lead from the ores of lead, also from metallic lead or from the oxide of this metal, by a novel and expeditious method; second, in the treatment of a sulphate so produced, in order to obtain a superior white lead.

With ores we proceed to prepare them by the treatment referred to in clause "First" of our patent of July 24, 1866, such ores being first well ground. This preliminary preparation converts the common sulphide or carbonate, whichever ore happens to be under treatment, into oxide. When preparing oxide from metallic lead we prefer to use the ordinary plan of making litharge, the object being to procure a complete oxide.

Now, for the conversion of the resulting oxide or oxides of lead, whether produced from ores or metallic lead, into sulphate, we first intimately mix this powder, by means of a vessel constructed with a stirrer, or other suitable contrivance for the purpose, with about two and a half per centum of nitric acid and sufficient water to form a thin pasty mass. This percentage of nitric acid was found by us to be about the best proportion, although almost any quantity, from one to fifty per cent., may be used. It will be seen in the next stage of our process that the acid merely acts as an agent or auxiliary, which is almost immediately liberated and nearly the entire quantity finally recovered for further use in its original condition. Second, we then gradually introduce sulphuric acid, with more or less water, sufficient to keep the mass in a thin paste; the combination of which causes considerable heat when attacking the nitrates, (produced by the nitric acid,) and instantly forming a portion of sulphate of lead. The nitric acid thus set free again attacks a fresh portion of oxide, converting it also into a nitrate of lead, which is no sooner formed than it is again separated by the stronger sulphuric acid, and a further supply of sulphate is produced. This action and reaction is continued until the whole mass is converted, which generally takes place in the course of a few hours. Instead of using nitric acid, which we prefer, acetic acid may be substituted; the latter has a similar action in operating on the oxide, but does not act so quickly, besides takes a larger quantity and is more expensive. The nitric acid may be nearly all recovered after the formation of the sulphate by subjecting the mass to the action of an hydraulic press. It may also be recovered by gentle evaporation, by means of heat in pans, or vessels, and then condensed, but we prefer the use of the press. The sulphate obtained by this plan is very superior to the ordinary common sulphate, as produced by complete or separate solution, and precipitation with large quantities of acids; the latter method being to dissolve by nitric acid into a clear solution or nitrate of lead, then to obtain a precipitated sulphate by sulphuric acid, (as it is found described in our said patent of July 24, 1866, but not claimed therein,) which causes the particles to assume a crystalline condition, unfit for the purpose of white lead as a paint without further treatment, while the sulphate produced by the new method above specified may be used for common pigment and for other purposes.

But, for the obtaining of a very superior article of white lead, we proceed to treat this sulphate so produced by our new method, as follows, as the conversion of this sulphate of lead into a superior white lead by the treatments hereinafter mentioned, taken in combination with the new process of deriving the sulphate, constitutes the second branch of our said improvements. We now submit this sulphate to an intimate contact with an alkali solution contained in vessels, or boilers, and boil it from two to three hours; the quantity of the alkali used being about three per cent. The effect of the alkali is to deprive the sulphate of a portion of its acid and water in combination therewith, and thereby produce a new article, or what we term a sub-sulphate of lead, and which possesses qualities superior to the best white lead of commerce. This product is then washed in vats, again subjected to the action of the hydraulic press for the purpose of solidifying the mass, which facilitates handling, and afterwards dried in pans, or on shelves in a building expressly constructed for air-drying, or in chambers by the application of heat.

We desire to state here that our proportions may be varied or changed by using more or less alkali, but results so far have determined us to use the above stated quantity; also, that the constitution of the sulphate may be first changed into a carbonate of lead by the use of the carbonate of either potash, soda, or lime, and finally treated with the alkali solution. We find also by experiments, that an alkaline effect is produced on this sulphate by the direct use of any alkaline compound, without being afterwards treated by an alkali solution, giving nearly the same results. Our alkali solution may be made from either potash, soda, or lime.

We do not claim the preparing of the ores or the metallic lead previous to their treatment with the acids; nor do we herein claim the after treatment of the common sulphate, produced as stated in our said patent of July 24, 1866; but what we do claim, and desire now to secure by Letters Patent, is—

1. The production of a sulphate of lead in the manner, and for the purposes substantially as described.

2. The treatment of the sulphate of lead so produced, with an alkali solution in the manner and for the purpose substantially as described.

3. The treatment of the sulphate of lead so produced, with the carbonate of either potash, soda, or lime, followed by an alkali solution, in the manner and for the purpose substantially as described.

4. The treatment of the sulphate of lead so produced, with any alkaline compound, in the manner and for the purpose substantially as described.

5. The manufacture of white lead from the ores of lead, or the metallic lead, or from the oxide of this metal, by the use of nitric and sulphuric acids, in combination with an alkali solution, either with or without the prior treatment by an alkali compound, substantially as described.

THOMAS M. FELL,
AMBROSE G. FELL.

Witnesses:
Wm. F. McNamara,
John McIntyre.